United States Patent
Cai et al.

(10) Patent No.: US 12,467,942 B2
(45) Date of Patent: Nov. 11, 2025

(54) ON-SITE RECIPROCITY CALIBRATION METHOD FOR PIEZOELECTRIC ACCELEROMETER

(71) Applicant: National Institute of Metrology, China, Beijing (CN)

(72) Inventors: Chenguang Cai, Beijing (CN); Ping Yang, Beijing (CN); Zhihua Liu, Beijing (CN)

(73) Assignee: National Institute of Metrology, China, Beijing (CN)

( * ) Notice: Subject to any disclaimer, the term of this patent is extended or adjusted under 35 U.S.C. 154(b) by 197 days.

(21) Appl. No.: 18/465,678

(22) Filed: Sep. 12, 2023

(65) Prior Publication Data

US 2024/0069063 A1    Feb. 29, 2024

(30) Foreign Application Priority Data

Sep. 15, 2022    (CN) .......................... 202211124278.0

(51) Int. Cl.
*G01P 21/00* (2006.01)
*G01P 15/09* (2006.01)

(52) U.S. Cl.
CPC .......... *G01P 21/00* (2013.01); *G01P 15/0915* (2013.01)

(58) Field of Classification Search
CPC ...... G01P 21/00; G01P 15/0915; G01P 15/09; G01P 15/0907; G01P 15/0922; G01H 11/08
USPC .............. 348/61; 73/1.37, 1.38; 702/96, 104
See application file for complete search history.

(56) References Cited

U.S. PATENT DOCUMENTS

2012/0059620 A1    3/2012 Lee

FOREIGN PATENT DOCUMENTS

| CN | 101101306 A | 1/2008 |
| CN | 103759814 A | 4/2014 |
| CN | 106500832 A | 3/2017 |
| CN | 110702946 A | 1/2020 |
| CN | 210775551 U | 6/2020 |
| CN | 113959464 A | 1/2022 |
| CN | 114383712 A | 4/2022 |
| CN | 216792270 U | 6/2022 |

*Primary Examiner* — Robert R Raevis

(57) ABSTRACT

An on-site reciprocity calibration method for a piezoelectric accelerometer, including a vibration test and a reciprocity test. In the vibration test, a sine excitation with a corresponding frequency and amplitude is provided by a vibration exciting device to the piezoelectric accelerometer fixed on a motion plane, and output signals of a drive port and a signal port of the reciprocal piezoelectric accelerometer are collected by a data acquisition device. In the reciprocity test, a sine voltage excitation is provided by a signal generator to the drive port, and then an excitation signal and an output signal of the signal port are collected by the data acquisition device. An amplitude ratio of the two signals is obtained based on signal sine-fitting. Finally, the on-site calibration is enabled according the sensitivity amplitude ratio obtained in the vibration test and the sensitivity amplitude product obtained in the reciprocity test.

1 Claim, 2 Drawing Sheets

ON-SITE RECIPROCITY CALIBRATION METHOD FOR PIEZOELECTRIC ACCELEROMETER

CROSS-REFERENCE TO RELATED APPLICATIONS

This application claims the benefit of priority from Chinese Patent Application No. 202211124278.0, filed on Sep. 15, 2022. The content of the aforementioned application, including any intervening amendments thereto, is incorporated herein by reference in its entirety.

TECHNICAL FIELD

This application relates to the field of vibration calibration, and more particularly to an on-site calibration method of vibration sensors.

BACKGROUND

Vibration sensors have been widely used in the fields of fault diagnosis, environmental monitoring, structure safety inspection. Regular calibration is beneficial to ensure the accuracy and sensitivity of vibration sensors, so as to improve the accuracy and reliability of the collected data, and the calibration accuracy will directly affect the effectiveness of practical engineering applications. Considering that some vibration sensors cannot be regularly delivered to the laboratory for calibration, and need to be directly calibrated on site in some practical application scenarios, a reciprocal piezoelectric accelerometer, namely a piezoelectric accelerometer with a drive port and a signal port, has been designed and applied. However, it has been rarely researched on the principle and application of its calibration method in the prior art. Therefore, this application provides an on-site reciprocity calibration method for piezoelectric accelerometers with high accuracy.

At present, the common calibration methods of vibration sensors include laser interferometry and comparison method. The laser interferometry based on Doppler velocimetry and laser interference has the advantages of strong anti-interference ability, good dynamic performance, wide frequency measuring range and high linearity, and can achieve the high-precision displacement and trajectory measurement of planar motions. However, it struggles with complex measuring system, high cost and poor flexibility, and cannot be applied to the on-site calibration. By contrast, the comparison method only needs a reference vibration sensor, which is back-to back installed on a vibration platform to achieve the calibration. It has the advantages of simple measuring system, and flexible and efficient operation; however, there are no enough reference sensors available, and the reference sensor struggles with high cost and poor precision, and thus cannot be applied to the on-site calibration. The existing reciprocity calibration methods based on electrical quantity measuring can achieve the high-accuracy calibration, and is suitable for the calibration of the reciprocal piezoelectric accelerometer. Based on the reciprocity calibration method, an on-site calibration of the reciprocal piezoelectric accelerometer is achieved through vibration test and reciprocity test.

Therefore, in view of the problems in the prior art that it is hard to carry out regular calibration of the existing vibration sensors; the laboratory calibration has high cost; and there is a lack of appropriate on-site calibration method, this application provides a simple, efficient and accurate on-site reciprocity calibration method for piezoelectric accelerometers. Based on the basic calibration principle of the reciprocity method, the on-site calibration is achieved by measuring the electrical quantity ratio of the reciprocal piezoelectric accelerometer in two tests, which is conducive to the development of on-site calibration method.

SUMMARY

In view of the problems in the prior art that it is difficult to regularly calibrate the existing vibration sensors; the laboratory calibration has high cost; and there is a lack of a feasible on-site calibration method, this application provides a simple, efficient and accurate on-site calibration method for reciprocal piezoelectric accelerometers, which includes:

Two-Port Output Signal Acquisition of a Vibration Test
    a vibration exciting device provides a sinusoidal excitation with corresponding frequency and amplitude of the reciprocal piezoelectric accelerometer which is fixed on a motion plane, and a data acquisition device is configured to acquire output signals of a signal port and an output port;

a Reciprocity Test Excitation Signal and Signal Acquisition of the Signal Port
    a signal generator is configured to provide a sinusoidal voltage excitation with corresponding frequency and amplitude of a drive port of a reciprocity accelerometer provided on a work plane, and the data acquisition device is configured to acquire excitation signals and output signals of the signal port;

Calculating a Ratio of Sensitivity Amplitude and a Product of Sensitivity Amplitude
    based on an amplitude of the vibration test and an amplitude of the reciprocity test acquired by a sine-fitting method, amplitude ratios of signals, which are a sensitivity amplitude ratio and a sensitivity amplitude product, are acquired;

On-Site Sensitivity Calibration
    based on the sensitivity amplitude ratio and the sensitivity amplitude product measured by a known self-calibration coefficient, corresponding sensitivity amplitudes of the signal port and the output port are acquired, so as to realize the on-site calibration.

This application provides an on-site calibration method for a reciprocal piezoelectric accelerometer, comprising:
    (S1) fixing an installation base of the reciprocal piezoelectric accelerometer on the motion plane of the vibration exciting device; and outputting, by the vibration exciting device, a sinusoidal vibration excitation at ⅓ octave band under a condition that an output amplitude of the vibration exciting device is greater than a minimum signal-to-noise ratio of an output signal of the reciprocal piezoelectric accelerometer;
    (S2) under the sinusoidal vibration excitation, acquiring, by an acquisition device, a first signal output from the drive port of the reciprocal piezoelectric accelerometer and a second signal output from a signal port of the reciprocal piezoelectric accelerometer, and sending the first signal and the second signal to an upper computer for signal processing;
    (S3) based on a signal sine-fitting method, acquiring an amplitude of the first signal and an amplitude of the second signal; and calculating a ratio of the amplitude of the first signal to the amplitude of the second signal, so as to acquire a sensitivity amplitude ratio of the drive port and the signal port;

(S4) placing the reciprocal piezoelectric accelerometer on a stable work plane, and connecting an output port of the signal generator to the drive port of the reciprocal piezoelectric accelerometer; and outputting a sinusoidal voltage excitation at ⅓ octave band and an output voltage of 1-5V;

(S5) under the sinusoidal voltage excitation, acquiring, by the data acquisition device, an electric excitation signal of the signal generator and a third signal output from the signal port of the reciprocal piezoelectric accelerometer, and sending the electric excitation signal and the third signal to the upper computer for signal processing;

(S6) based on the signal sine-fitting method, acquiring an amplitude of the electric excitation signal and an amplitude of the third signal; and calculating a ratio of the amplitude of the electric excitation signal to the amplitude of the third signal, so as to acquire a sensitivity amplitude product of the drive port and the signal port; and (S7) according to the sensitivity amplitude ratio and the sensitivity amplitude product, calculating a sensitivity amplitude of the drive port and a sensitivity amplitude of the signal port, so as to realize the on-site calibration for the reciprocal piezoelectric accelerometer, and saving and displaying sensitivity calibration results.

Signal $U_1(t_j)$ and signal $U_2(t_j)$ collected by two channels of the data acquisition device at time $t_j$ are fitted by the following sine-approximation methods, respectively:

$$\begin{cases} U_1(t_j) = A_1\cos(\omega_v t_j) - B_1\sin(\omega_v t_j) + C_1 \\ U_2(t_j) = A_2\cos(\omega_v t_j) - B_2\sin(\omega_v t_j) + C_2 \end{cases}; \quad (1)$$

where $\omega_v$ represents a vibration angular frequency; parameters $A_1$, $B_1$, $C_1$, $A_2$, $B_2$ and $C_2$ are sine-fitting coefficients to be solved, and are obtained by solving corresponding N equations respectively;

a peak value $\hat{S}_1$ of the signal $U_1(t_j)$ is obtained according to parameters $A_1$ and $B_1$, and a peak value $\hat{S}_2$ of the signal $U_2(t_j)$ is obtained according to parameters $A_2$ and $B_2$ represented by:

$$\begin{cases} \hat{S}_1 = \sqrt{A_1^2 + B_1^2} \\ \hat{S}_2 = \sqrt{A_2^2 + B_2^2} \end{cases}; \quad (2)$$

the sensitivity amplitude $S_{a1}$ of the drive port and the sensitivity amplitude $S_{a2}$ of the signal port acquired in the on-site calibration of the reciprocal piezoelectric accelerometer are determined by an amplitude ratio $u_1$ of the first signal to the second signal and an amplitude ratio $u_2$ of the electric excitation signal to the third signal, represented by:

$$\begin{cases} u_1 = \dfrac{\hat{S}_1'}{\hat{S}_2'} = \dfrac{S_{a1}}{S_{a2}} \\ u_2 = \dfrac{\hat{S}_1''}{\hat{S}_2''} = cS_{a1}S_{a2} \end{cases}; \quad (3)$$

and where $\hat{S}_1'$ represents the amplitude of the first signal, and $\hat{S}_2'$ represents the amplitude of the second signal; and $\hat{S}_1''$ represents the amplitude of the electric excitation signal, and $\hat{S}_2''$ represents the amplitude of the third signal; c represents a self-calibration coefficient which is determined by structure parameters of the reciprocal piezoelectric accelerometer and is a known value; and the sensitivity amplitude $S_{a1}$ and the sensitivity amplitude $S_{a2}$ are obtained as follows:

$$\begin{cases} S_{a1} = \sqrt{\dfrac{u_1 u_2}{c}} \\ S_{a2} = \sqrt{\dfrac{u_2}{cu_1}} \end{cases}. \quad (4)$$

This application further provides an on-site calibration device for a reciprocal piezoelectric accelerometer by using the on-site calibration method, comprising:
a vibration exciting device;
the reciprocal piezoelectric accelerometer;
a data acquisition device;
a signal generator; and
a signal processing and displaying unit;
wherein a work table of the vibration exciting device is configured to provide a planar motion of any trajectory; the reciprocal piezoelectric accelerometer is fixed on the work table of the vibration exciting device, such that the reciprocal piezoelectric accelerometer and the work table have the same motion characteristics;
in a vibration test, the vibration exciting device is configured to be driven by a first sinusoidal excitation generated by the signal generator to provide a sinusoidal vibration excitation to the reciprocal piezoelectric accelerometer; the data acquisition device is configured to acquire a first signal output from a drive port of the reciprocal piezoelectric accelerometer and a second signal output from a signal port of the reciprocal piezoelectric accelerometer; the signal processing and displaying unit is configured to process the first signal and the second signal and store measurement results; and
in a reciprocity test, the signal generator is configured to output a second sinusoidal excitation to the drive port of the reciprocal piezoelectric accelerometer; the data acquisition device is configured to acquire an excitation signal and a third signal output from the signal port of the reciprocal piezoelectric accelerometer; and the signal processing and displaying unit is configured to process the excitation signal and the third signal, and save and display calibration results.

The present disclosure has the following beneficial effects.

(1) The method of the present disclosure has low requirements on equipment and calibration technology, and is suitable to apply in project site, which can solve the problem that the existing vibration sensors cannot be calibrated regularly.

(2) The method of the present disclosure has low application cost and high calibration accuracy. For the high-precision on-site calibration for reciprocal piezoelectric accelerometers within different frequency ranges, it is only needed to provide a vibration exciting device and a signal generation and processing device.

(3) The method of the present disclosure has simple operation steps. And the on-site calibration with high accuracy can be realized only by measuring electrical quantity signal of the vibration test and the reciprocity test, which avoids measurement of complex mechanical quantity.

(4) The method of the present disclosure belongs to vibration calibration methods, and the method can realize on-site calibration for reciprocal piezoelectric accelerometers within a certain frequency range based on calibration principle of the reciprocity method.

(5) The method of the present disclosure measures a sensitivity amplitude ratio and a sensitivity amplitude product of the drive port and the signal port of the reciprocal piezoelectric accelerometer by the vibration test and the reciprocity test. This application is conducive to the on-site calibration traceability for reciprocal piezoelectric accelerometers.

DETAILED DESCRIPTION OF EMBODIMENTS

In order to solve the problems that the existing vibration sensors have complex system, high cost and poor flexibility, and cannot satisfy the on-site calibration, the present disclosure provides an on-site reciprocity calibration device for piezoelectric accelerometers. In the present disclosure, the sensitivity amplitude ratio and the sensitivity amplitude product of two ports of a reciprocal piezoelectric accelerometer are measured respectively in two tests, and are further applied to the on-site high-precision calibration within a frequency range of 5-4000 Hz. The present disclosure will be further described below with reference to the embodiments.

Figure 1A:
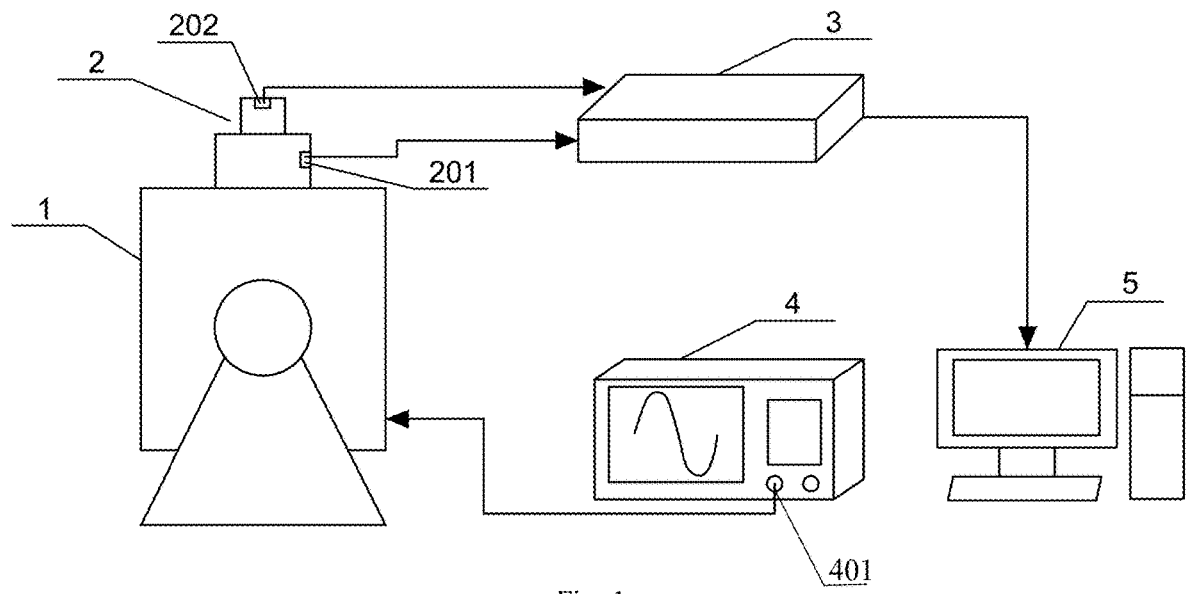
FIG. 1a schematically shows a signal transmission in a vibration test according to an embodiment of the present disclosure.
Figure 1B:
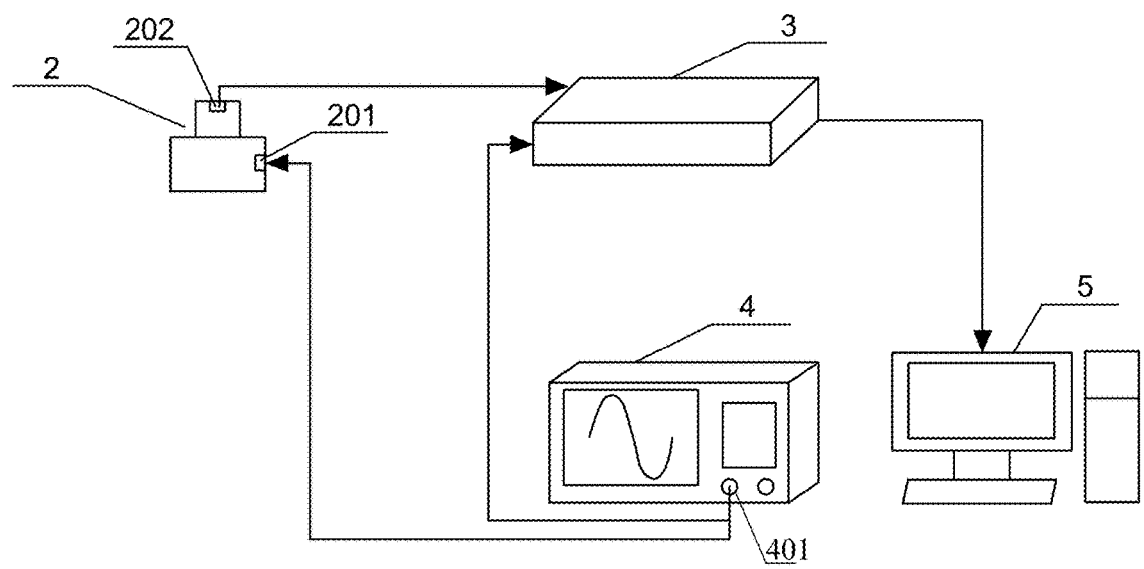
FIG. 1b schematically shows a signal transmission in a reciprocity test according to an embodiment of the present disclosure.

Referring to FIG. 1a and FIG. 1b, an on-site calibration device is provided, which includes: a vibration exciting device 1, a reciprocal piezoelectric accelerometer 2, a data acquisition device 3, a signal generator 4 and a signal processing and displaying unit 5; in a vibration test, the vibration exciting device 1 is driven by a sinusoidal excitation of the signal generator 4, and is configured to provide the sinusoidal excitation for the reciprocal piezoelectric accelerometer 2 arranged on a work table; the data acquisition device 3 is configured to acquire a first signal output from a drive port 201 of the reciprocal piezoelectric accelerometer 2 and a second signal output from a signal port 202 of the reciprocal piezoelectric accelerometer 2; the signal processing and displaying unit 5 is configured to process the first signal and the second signal and save measuring results; in a reciprocity test, the signal generator 4 is configured to output a sinusoidal excitation to the drive port 201 of the reciprocal piezoelectric accelerometer 2; the data acquisition device 3 is configured to acquire an excitation signal and a third signal output from the signal port 202 of the reciprocal piezoelectric accelerometer 2; and the signal processing and displaying unit 5 is configured to process the third signal and the excitation signal, and save and show final calibration results.

Figure 2:
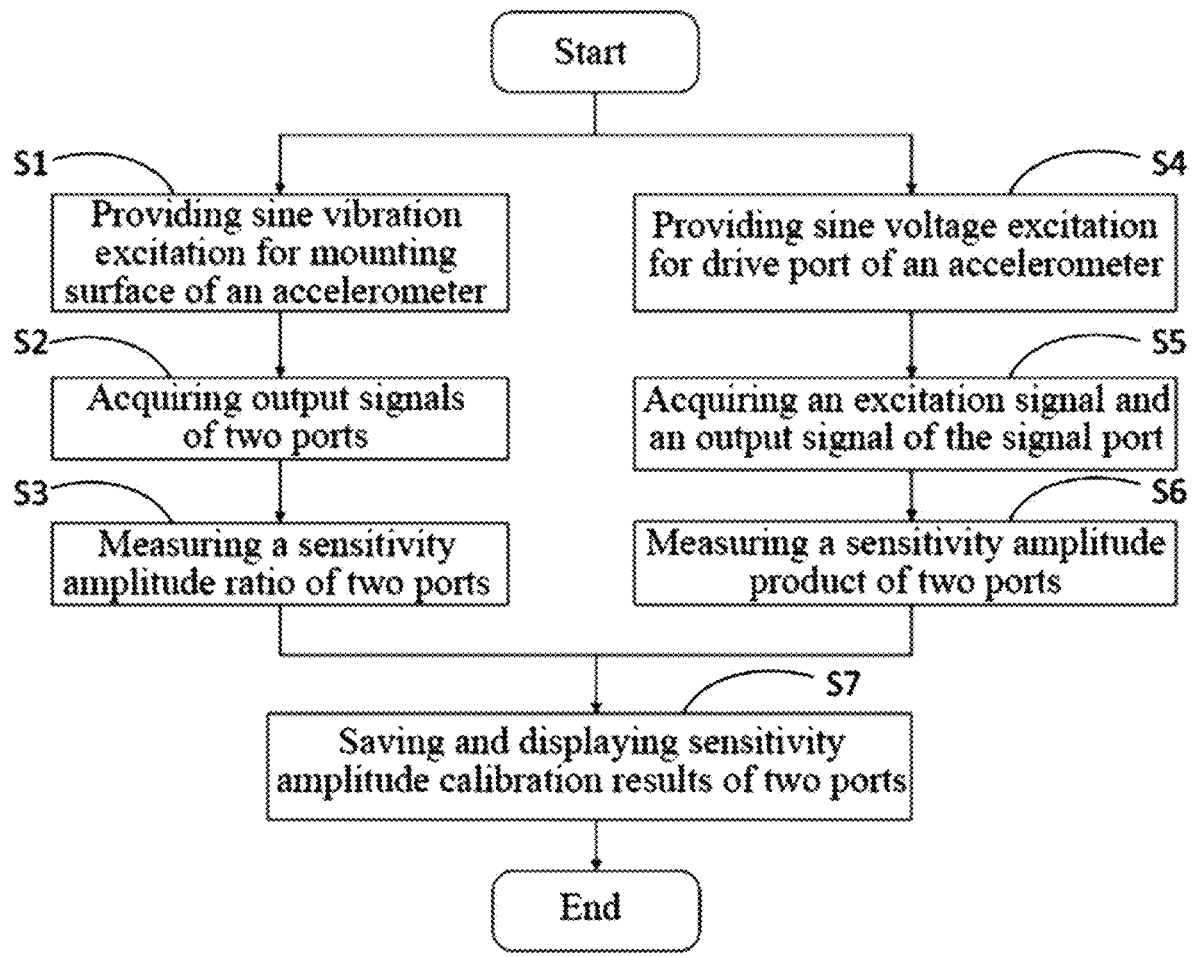
FIG. 2 is a flowchart of an on-site reciprocity calibration device for piezoelectric accelerometers according to an embodiment of the present disclosure.

Referring to FIG. 2, an on-site calibration method for a reciprocal piezoelectric accelerometer is performed through the following steps.

(S1) An installation base of the reciprocal piezoelectric accelerometer is fixed on a motion plane of the vibration exciting device. And a sinusoidal vibration excitation at a ⅓ octave band, is output by the vibration exciting device under a condition that an output amplitude of the vibration exciting device is greater than a minimum signal-to-noise ratio of an output signal of the reciprocal piezoelectric accelerometer.

(S2) Under the sinusoidal vibration excitation, a first signal output from the drive port 201 of the reciprocal piezoelectric accelerometer and a second signal output from the signal port 202 of the reciprocal piezoelectric accelerometer are acquired by a data acquisition device, and the first signal and the second signal are sent to an upper computer for signal processing.

(S3) Based on a signal sine-fitting method, an amplitude of the first signal and an amplitude of the second signal is acquired, and a ratio of the amplitude of the first signal to the amplitude of the second signal is calculated, so as to acquire a sensitivity amplitude ratio of the signal port 202.

(S4) The reciprocal piezoelectric accelerometer is placed on a stable work plane, and an output port 401 of the signal generator is connected to the drive port 201 of the reciprocal piezoelectric accelerometer. And a sinusoidal voltage excitation is output at ⅓ octave band and an output voltage of 1-5V.

(S5) Under the sinusoidal voltage excitation, an electric excitation signal of the signal generator 4 and a third signal output from the signal port 202 of the reciprocal piezoelectric accelerometer are acquired by the data acquisition device, and the electric excitation signal and the third signal are sent to the upper computer for signal processing.

(S6) Based on the signal sine-fitting method, an amplitude of the electric excitation signal and an amplitude of the third signal are acquired. A ratio of the amplitude of the electric excitation signal to the amplitude of the third signal is calculated, so that a sensitivity amplitude product of the drive port 201 and the signal port 202 are acquired.

(S7) According to the sensitivity amplitude ratio and the sensitivity amplitude product, a sensitivity amplitude of the drive port 201 and a sensitivity amplitude of the signal port 202 are calculated, so that on-site calibration for the reciprocal piezoelectric accelerometer is realized, and sensitivity calibration results are saved and displayed.

Parameters of the device of the present disclosure are as follows. A high frequency vibration table has a frequency range of 5~20000 Hz and a maximum peak acceleration of 20 g. The reciprocal piezoelectric accelerometer is an accelerometer with a shear type structure and two ports, and is suitable for a low and medium frequency range. The signal generator is a waveform generator with a maximum output frequency of 60 MHz, a sampling rate of 200 MSa/s and a vertical resolution of 14 bits. And the data acquisition device is a portable acquisition equipment with 24-bit ADC and a sampling rate of 102.4K Hz.

In order to verify an accuracy of the on-site calibration method for a reciprocal piezoelectric accelerometer, the present disclosure realizes the on-site calibration with high accuracy for the reciprocal piezoelectric accelerometer within a frequency range of 5~4000 Hz. Table 1 shows calibration results for the reciprocal piezoelectric accelerometer within the frequency range of 5~4000 Hz of the present disclosure and a laser interferometry respectively. According to results of the Table 1, measuring results of the present disclosure are similar to measuring results of the laser interferometry. A maximum relative deviation of a sensitivity amplitude $S_{a1}$ of the signal port is about 2%, and a maximum relative deviation of a sensitivity amplitude $S_{a2}$ of the drive port is about 4%.

TABLE 1

Measuring results of plane motion displacement by the on-site calibration method and the laser interferometry method

| Frequency | On-site calibration | | Laser interferometry | |
|---|---|---|---|---|
| (Hz) | $S_{a1}$(pC/g) | $S_{a2}$(pC/g) | $S_{a1}$(pC/g) | $S_{a2}$(pC/g) |
| 5 | 24.84 | 44.90 | 25.23 | 45.76 |
| 10 | 24.71 | 44.69 | 25.10 | 45.35 |
| 16 | 24.70 | 44.49 | 24.88 | 45.02 |
| 25 | 24.46 | 44.07 | 24.85 | 44.84 |
| 40 | 24.37 | 43.95 | 24.65 | 44.81 |
| 80 | 24.37 | 44.07 | 24.72 | 44.65 |
| 160 | 24.39 | 43.88 | 24.69 | 44.48 |
| 250 | 24.46 | 43.99 | 24.72 | 44.66 |
| 400 | 24.61 | 44.30 | 24.76 | 45.20 |
| 630 | 24.57 | 44.23 | 24.52 | 45.48 |
| 800 | 24.57 | 44.21 | 24.70 | 45.03 |
| 1000 | 24.83 | 44.70 | 24.78 | 45.71 |
| 2000 | 25.92 | 46.52 | 25.73 | 48.29 |
| 3000 | 27.56 | 48.78 | 27.17 | 50.70 |
| 4000 | 28.61 | 50.39 | 28.57 | 51.64 |

Described above are only detailed description of embodiments of this application, and are not intended to limit this application in any form. A series of optimizations, improvements and modifications can be made by those skilled in the art based on this application. It should be noted that those optimizations, improvements and modifications made without departing from the spirit of this application shall fall within the scope of this application defined by the appended claims.

What is claimed is:

1. An on-site calibration method for a reciprocal piezoelectric accelerometer, comprising:
(S1) fixing an installation base of the reciprocal piezoelectric accelerometer on a motion plane of a vibration exciting device; and outputting, by the vibration exciting device, a sinusoidal vibration excitation at a ⅓ octave band under a condition that an output amplitude of the vibration exciting device is greater than a minimum signal-to-noise ratio of an output signal of the reciprocal piezoelectric accelerometer;
(S2) under the sinusoidal vibration excitation, acquiring, by a data acquisition device, a first signal output from a drive port of the reciprocal piezoelectric accelerometer and a second signal output from a signal port of the reciprocal piezoelectric accelerometer, and sending the first signal and the second signal to an upper computer for signal processing;
(S3) based on a signal sine-fitting method, acquiring an amplitude of the first signal and an amplitude of the second signal; and calculating a ratio of the amplitude of the first signal to the amplitude of the second signal, so as to acquire a sensitivity amplitude ratio of the drive port and the signal port;
(S4) placing the reciprocal piezoelectric accelerometer on a stable work plane, and connecting an output port of a signal generator to the drive port of the reciprocal piezoelectric accelerometer; and outputting a sinusoidal voltage excitation at the ⅓ octave band and an output voltage of 1-5 V;
(S5) under the sinusoidal voltage excitation, acquiring, by the data acquisition device, an electric excitation signal of the signal generator and a third signal output from the signal port of the reciprocal piezoelectric accelerometer, and sending the electric excitation signal and the third signal to the upper computer for signal processing;
(S6) based on the signal sine-fitting method, acquiring an amplitude of the electric excitation signal and an amplitude of the third signal; and calculating a ratio of the amplitude of the electric excitation signal to the amplitude of the third signal, so as to acquire a sensitivity amplitude product of the drive port and the signal port; and
(S7) according to the sensitivity amplitude ratio and the sensitivity amplitude product, calculating a sensitivity amplitude of the drive port and a sensitivity amplitude of the signal port, so as to realize on-site calibration for the reciprocal piezoelectric accelerometer, and saving and displaying sensitivity calibration results;
wherein in each of step (S2) and step (S5), signal $U_1(t_j)$ and signal $U_2(t_j)$ collected by two channels of the data acquisition device at time $t_j$ are fitted by the following sine-approximation methods, respectively:

$$\begin{cases} U_1(t_j) = A_1\cos(\omega_v t_j) - B_1\sin(\omega_v t_j) + C_1 \\ U_2(t_j) = A_2\cos(\omega_v t_j) - B_2\sin(\omega_v t_j) + C_2 \end{cases} \quad (1)$$

wherein $\omega_v$ represents a vibration angular frequency; parameters $A_1$, $B_1$, $C_1$, $A_2$, $B_2$ and $C_2$ are sine-fitting coefficients to be solved, and are obtained by solving corresponding N equations based on the sine-approximation methods, respectively; and
a peak value $\hat{S}_1$ of the signal $U_1(t_j)$ is obtained according to parameters $A_1$ and $B_1$, and a peak value $\hat{S}_2$ of the signal $U_2(t_j)$ is obtained according to parameters $A_2$ and $B_2$, represented by:

$$\begin{cases} \hat{S}_1 = \sqrt{A_1^2 + B_1^2} \\ \hat{S}_2 = \sqrt{A_2^2 + B_2^2} \end{cases} \quad (2)$$

wherein the sensitivity amplitude $S_{a1}$ of the drive port and the sensitivity amplitude $S_{a2}$ of the signal port acquired in the on-site calibration of the reciprocal piezoelectric accelerometer are determined by an amplitude ratio $u_1$ of the first signal to the second signal obtained in step (S3) and an amplitude ratio $u_2$ of the electric excitation signal to the third signal obtained in step (S6), represented by:

$$\begin{cases} u_1 = \dfrac{\hat{S}_1'}{\hat{S}_2'} = \dfrac{S_{a1}}{S_{a2}} \\ u_2 = \dfrac{\hat{S}_1''}{\hat{S}_2''} = cS_{a1}S_{a2} \end{cases} \quad (3)$$

wherein $\hat{S}_1'$ represents the amplitude of the first signal, and $\hat{S}_2'$ represents the amplitudes of the second signal; $\hat{S}_1''$ represents the amplitude of the electric excitation signal, and $\hat{S}_2''$ represents the amplitude of the third signal; c represents a self-calibration coefficient which is determined by structure parameters of the reciprocal piezoelectric accelerometer and is a known value; and the sensitivity amplitude $S_{a1}$ and the sensitivity amplitude $S_{a2}$ are obtained as follows:

$$\begin{cases} S_{a1} = \sqrt{\dfrac{u_1 u_2}{c}} \\ S_{a2} = \sqrt{\dfrac{u_2}{cu_1}} \end{cases}.$$

* * * * *